United States Patent [19]

Makagawa et al.

[11] Patent Number: 4,802,021

[45] Date of Patent: Jan. 31, 1989

[54] RECORDING AND/OR REPRODUCING APPARATUS USING OPTO-MAGNETIC DISC

[75] Inventors: Shozo Makagawa; Shunichi Onishi; Akihiro Takagi, all of Tokyo, Japan

[73] Assignees: Asaka Company Limited; Nikon Corporation, both of Tokyo, Japan

[21] Appl. No.: 106,393

[22] Filed: Oct. 9, 1987

[30] Foreign Application Priority Data

Oct. 21, 1986 [JP] Japan ............................ 61-251129

[51] Int. Cl.⁴ ...................... H04N 5/76; G11B 13/04
[52] U.S. Cl. .................................. 358/342; 360/59; 360/114; 369/13
[58] Field of Search ................. 358/342; 360/59, 114; 369/13

[56] References Cited

U.S. PATENT DOCUMENTS 4,748,605  5/1988  Sakai et al. .................... 360/59 X Primary Examiner—L. T. Hix
Assistant Examiner—D. Rutledge
Attorney, Agent, or Firm—Peter J. Georges

[57] ABSTRACT

An apparatus for recording and/or reproducing a signal by using an opto-magnetic disc including an erasing and reproducing opto-magnetic head unit having outer and inner opto-magnetic heads, a recording and reproducing opto-magnetic head unit having outer and inner opto-magnetic heads, a first slider mechanism for moving the erasing and reproducing opto-magnetic head unit in a radial direction of the opto-magnetic disc, and a second slider mechanism for moving the recording and reproducing opto-magnetic head unit in the radial direction of the opto-magnetic disc, the erasing and reproducing opto-magnetic head unit being separated from the recording and reproducing opto-magnetic head unit by substantially 180°.

9 Claims, 2 Drawing Sheets

4,802,021

RECORDING AND/OR REPRODUCING APPARATUS USING OPTO-MAGNETIC DISC

BACKGROUND OF THE INVENTION

Field of the Invention and Related Art Statement

The present invention relates to a recording and reproducing apparatus using opto-magnetic discs, and more particularly to an apparatus for recording and/or reproducing a real time signal such as a television signal by using the opto-magnetic disc.

The opto-magnetic disc has been used to record a new information signal be erasing a previously recorded information signal. The erasing operation is carried out by projecting a light beam spot upon the disc, while the disc is subjected to an erasing bias magnetic field having a predetermined first direction. During the recording operation, the disc is subject to a recording bias magnetic field having a second direction opposite to said first direction and the light beam spot whose intensity is modulated in accordance with the information signal to be recorded is projected upon the opto-magnetic disk. In this manner, in order to effect the recording in the known apparatus it is necessary to trace an information track on the disc twice. Therefore, it is impossible to record a real time signal such as a television signal. Further, in case of effecting the reproduciton, since the opto-magnetic head needs a rather long access time of at least several hundreds milliseconds, there would be produced a time gap from an end of the reproduction of a certain event to a start of the reproduction of a next event, so that the continuous reproduction could not be performed.

In the known apparatus, the television signal of one frame or field is recorded on one turn of the information track on the opto-magnetic disc. In case of effecting the reproduction in a special mode such as a slow motion mode, the track jump is carried out during a vertical blanking period of the television signal. Then, it is apparent that the record density is reduced due to the fact that the blanking period is also recorded on the disc.

In the known apparatus in which the revolution velocity of the opto-magnetic disc is remained constant, the record density in an outer region of the disc is smaller than that in an inner region and thus the total record density is rather low. It is also known to vary the rotating velocity of the disc is changed in accordance with positions thereon such that the record density is remained constant all over the record region of the disc. However, in such an apparatus, it is difficult to achieve the high speed access and special mode of reproduction, because the television signal of one frame or field is no more recorded on one turn of the information track.

SUMMARY OF THE INVENTION

The present invention has for its object to provide a novel and useful apparatus for recording and reproducing an information signal, particularly a real time signal such as a television signal by using an opto-magnetic disc, in which the record density can be increased without sacrifying a special reproduction mode such as slow motion mode, search mode and eddition mode.

According to the invention, an apparatus for recording and reproducing a signal on and out of an opto-magnetic disc comprises a spindle for rotating the opto-magnetic disc, a spindle motor having an output shaft coupled with said spindle, an erasing and reproducing opto-magnetic head unit having outer and inner opto-magnetic head which are separated from each other in a radial direction of the opto-magnetic disc by a predetermined distance, a recording and reproducing opto-magnetic head unit having outer and inner opto-magnetic heads which are separated from each other in the radial direction by said predetermined distance, said recording and reproducing opto-magnetic head unit being arranged diametrically in opposition to each other with respect to a center axis of the opto-magnetic disc, means for moving said erasing and reproducing opto-magnetic head unit in the radial direction of the opto-magnetic disc, means for moving said recording and reproducing opto-magnetic head unit in the radial direction of the opto-magnetic disc, means for producing an erasing bias magnetic field at a position of the erasing and reproducing opto-magnetic head unit, and means for producing a recording bias magnetic field at a position of the recording and reproducing opto-magnetic head unit.

DESCRIPTION OF THE PREFERRED EMBODIMENT

Figure 1:
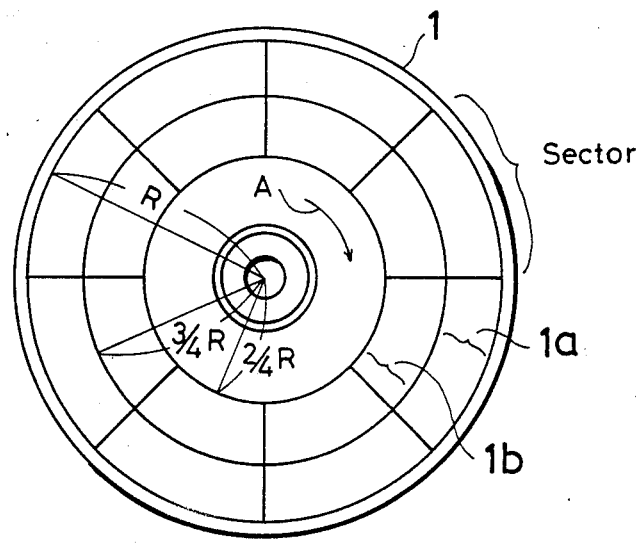
FIG. 1 is a schematic plan view showing a format of information record regions on an opto-magnetic disc.
Figure 2:
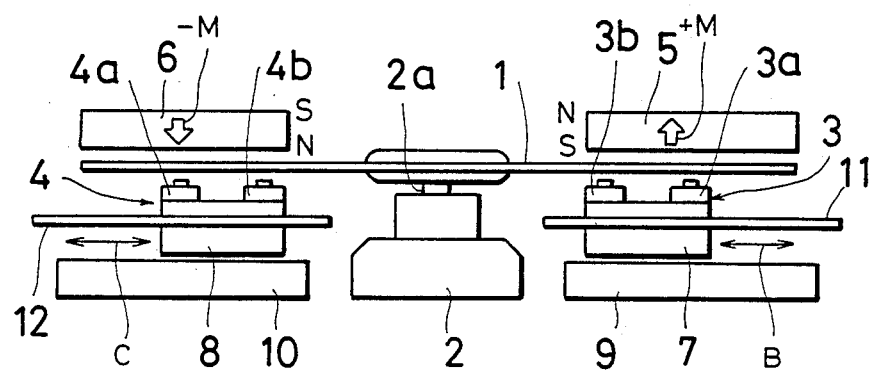
FIG. 2 is a schematic side view illustrating an embodiment of the recording and reproducing apparatus according to the invention.
Figure 3:
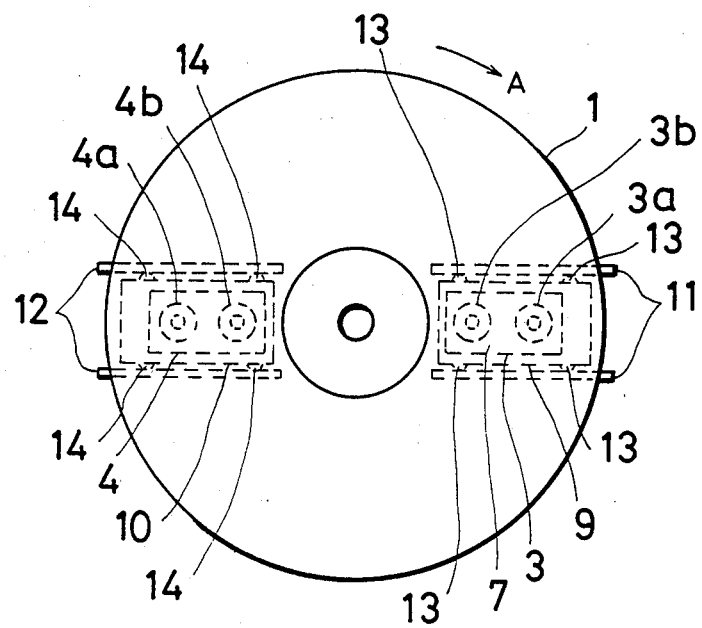
FIG. 3 is a plan view showing the apparatus of FIG. 2.

FIG. 1 is a plan view showing an opto-magnetic disc on which an information signal is to be recorded by the recording and reproducing apparatus according to the invention shown in FIGS. 2 and 3. A record region on the opto-magnetic disc 1 is divided into a ring-shaped outer record region 1a 1 and a ring-shaped inner record region 1b, these outer and inner record regions 1a and 1b being concentrical with each other with respect to a center axis of a spindle 2a. The disc 1 is rotated by a spindle motor 2 in a direction shown by an arrow A. The apparatus comprises an erasing and reproducing opto-magnetic head unit 3 and a recording and reproducing opto-magnetic head unit 4, these opto-magnetic head units being arranged diametrically in opposition to each other with respect to an axis of the spindle 2a, i.e. a center axis of the disc 1. That is to say, the opto-magnetic head units 3 and 4 are separated from each other by about 180°. Above the opto-magnetic head units 3 and 4 are arranged bias magnets 5 and 6, respectively for generating erasing and recording bias magnetic fields having opposite directions as shown by arrows +M and −M, respectively.

The erasing and reproducing opto-magnetic head unit 3 comprises outer opto-magnetic head 3a and inner opto-magnetic head 3b, and similarly the recording and reproducing opto-magnetic head unit 4 comprises an outer opto-magnetic head 4a and an inner opto-magnetic head 4b. The opto-magnetic heads 3a and 3b are provided on a head slider 7, and the opto-magnetic heads 4a and 4b are placed on a head slider 8. The head sliders 7 and 8 are supported by means of slide rails 11 and 12, respectively via bearings 13 and 14 movably in a radial direction of the opto-magnetic disc 1. Below the head sliders 7 and 8 are arranged slider driving magnets 9 and 10, respectively.

The outer opto-magnetic heads 3a and 4a are used to effect the recording and reproducing for the outer record region 1a of the opto-magnetic disc 1, and the inner opto-magnetic heads 3b and 4b are used for the inner record region 1b. When a radius of the opto-magnetic disc 1 is assumed to be R, the inner record region 1b extends in the radial direction from 2/4 R to 3/4 R and the outer record region 1a extends from 3/4 R to R. The outer and inner opto-magnetic heads 3a, 4a and 3b, 4b are separated from each other in the disc radial direction by a distance equal to ¼ R.

According to the present embodiment, the recording is so effected that a ratio of the record density in the outer record region 1a to that in the record region 1b is set to ⅔. Upon recording, a signal to be recorded is divided into a number of groups each being composed of five bytes, and three bytes in each group are recorded in the outer record region 1a by means of the outer opto-magnetic head 4a and the remaining two bytes are recorded in the inner record region 1b with the aid of the inner opto-magnetic head 4b. Upon reproducing the signal from the opto-magnetic disc, a possible jitter due to the variation in the rotational speed of the disc contained in the reproduced signal is first corrected, and then three bytes reproduced from the outer record region 1a by means of the outer opto-magnetic head 3a or 4a and two bytes reproduced out of the inner record region 1b with the aid of the inner opto-magnetic head 3b or 4b are combined with each other to generate the reproduced signal. To this end, a synchronizing code of the signal being recorded is composed of ten bytes, the total recorded information amounts to an integer multiple of five bytes and the number of interleaves of parity is an integer multiple of five bytes. In this manner, bit lengths in the outer and inner record regions 1a and 1b on the disc 1 can be made substantially identical with each other, and the memory capacity can be increased by 5/4 as compared with the known apparatus in which the recording is carried out by the constant bit frequency over the whole record region.

One turn of an information track on the opto-magnetic disc 1 is divided into eight sectors and the television signal of one field is recorded in five sectors. Then, the rotational speed of the opto-magnetic disc 1 is set to 37.5 r.p.s. Strictly speaking, in the NTSC system, the rotational speed is determined to 37.5/1.001 r.p.s.

In case of effecting the recording operation the light beam spot having a higher intensity is projected from the erasing/reproducing opto-magnetic head unit 3, while the disc 1 is subjected to the erasing bias magnetic field generated by the erasing magnet 5 to magnetize an illuminated portion of the disc 1 in the upward direction. In this manner, the previously recorded signal on the disc 1 is first erased. The erased portion of the disc 1 is then turned into a position above the recording/reproducing opto-magnetic head unit 4, and the light beam spot whose intensity is modulated in accordance with the signal to be recorded is projected upon the relevant portion, while the relevant portion is subjected to the recording bias magnetic field generated by the recording magnet 6. Then, the magnetization in a portion of the disc in which an information signal of "1" is to be recorded is reversed.

In order to perform the recording operation, the opto-magnetic head units 3 and 4 have to be precisely aligned with an information track on which a new information signal to be written. In case of husing a new opto-magnetic disc 1 on which any information signal has not been recorded all over the disc at sector addresses which are located at start positions in each sectors. Then, the erasing of the sector signal thus recorded is inhibited with the aid of pulses which are formed by index pulses representing rotational positions of the opto-magnetic disc 1. That is to say, the erasing and recording of the sector signal is inhibited by the so-called soft sector. In should be noted that when use is made of an opto-magnetic disc having the hard sector in which the sector numbers have been previously recorded, it is not necessary to effect the above explained operation.

In case of carrying out the reproduction, both the opto-magnetic head units 3 and 4 are used as the reproducing head. When one of the opto-magnetic head units 3 and 4 reproduces a certain event on a track, the other opto-magnetic head unit 4 or 3 is moved into a position corresponding to a track containing an event to be reproduced next. Since the track is formed as a spiral shape, after the other opto-magnetic head unit 4 or 3 has been positioned, the unit might be automatically moved inwardly or outwardly due to the tracking control. Therefore, each time the opto-magnetic disc 1 has rotated by one turn, the other opto-magnetic head unit 4 or 3 has to be kicked back by one track pitch so that the relevant unit is remained at the desired track until the one unit 3 or 4 finishes the reproduction. In this manner, successive events can be reproduced continuously without producing time gaps therebetween.

Figure 4:
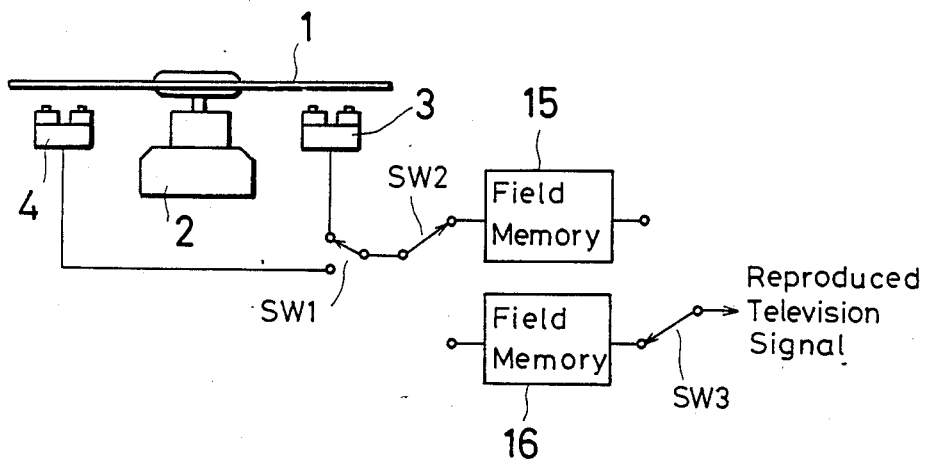
FIG. 4 is a block diagram showing a signal processing circuit for use in the slow motion reproduction according to the invention.

FIG. 4 is a block diagram of a signal processing circuit which is used in the slow motion mode reproduction. The television signal of successive fields reproduced by the opto-magnetic head units 3 and 4 are alternatively stored in field memories 15 and 16 by means of switches SW1 and SW2. If the slow motion speed is set to ½, the television signal stored in the field memories 15 and 16 is read out twice for two successive fields via a switch SW3. In the positions of the switches SW1-SW3 shown in FIG. 4, the television signal of a field reproduced by the opto-magnetic head unit 3 is stored in the first field memory 15 via the switches SW1 and SW2 and the television signal of the previous field stored in the second field memory 16 is read out via the switch SW3. During the television signal of one field, i.e. the disc 1 is rotated by five sectors, the opto-magnetic head units 3 and 4 are moved into a position corresponding to a track to be reproduced next, and when a start position of this field comes under one of the opto-magnetic head units 3 and 4, the reproduction is carried out. Since the two opto-magnetic head units 3 and 4 are separated by substantially 180°, the reproduction can be carried out by a near unit with the maximum waiting time of four sections. Therefore, it is sufficient to effect the track jump by a period of one sector. It should be noted that for the slow motion ratio from +1 to −0.5, the next field can be reproduced while the same field is reproduced more than two times.

In the search reproduction, it is sufficient to effect the reproduction of one field, the track jump for reproducing a next field and the wait for a start position while the same field is read out for N times, and the maximum waiting time is a four sector period. Therefore, if the track jump is effected within one sector period, the search reproduction with the two field repetition image can be carried out. If the track jump period corresponds to a six sector period, every third fields can be repetitively reproduced. In general, if the track jump can be effected within a time period corresponding to $1+5\times(N-2)$ sectors, every Nth fields can be reproduced in the search mode.

As explained above, in the opto-magnetic disc recording and/or reproducing apparatus according to the invention, the erasing/reproducing opto-magnetic head unit and the recording/reproducing opto-magnetic head unit are arranged substantially in opposite to each other relative to the center axis of the spindle, and the outer and inner opto-magnetic heads are provided on each head unit. Therefore, immediately after erasing the old information signal on the opto-magnetic disc, the new information signal can be recorded. Further, upon reproduction, successive events can be reproduced without a time gap there between. Further, various kinds of special reproduction modes such as the slow motion mode and search mode. Further, the record density can be increased by suitably determining the ratio of the record densities in the outer and inner record regions on the disc without sacrificing the access time and special reproduction modes.

What is claimed is:

1. An apparatus for recording and reproducing a signal on and out of an opto-magnetic disc comprising
   a spindle for rotating the opto-magnetic disc;
   a spindle motor having an output shaft coupled with said spindle;
   an erasing and reproducing opto-magnetic head unit having outer and inner opto-magnetic heads which are separated from each other in a radial direction of the opto-magnetic disc by a predetermined distance;
   a recording and reproducing opto-magnetic head unit having outer and inner opto-magnetic heads which are separated from each other in the radial direction by said predetermined distance, said recording and reproducing otpo-magnetic head unit being arranged diametrically in opposition to each other with respect to a center axis of the opto-magnetic disc;
   means for having said erasing and reproducing opto-magnetic head unit in the radial direction of the opto-magnetic disc;
   means for moving said recording and reproducing opto-magnetic head unit in the radial direction of the opto-magnetic disc;
   means for producing an erasing bias magnetic field at a position of the erasing and reproducing opto-magnetic head unit; and
   means for producing a recording bias magnetic field at a position of the recording and reproducing opto-magnetic head unit.

2. An apparatus according to claim 1, using an opto-magnetic disc whose record region is divided into outer and inner record regions which are concentrical with respect to the center axis of the spindle and have the same width viewed in the radial direction of the opto-magnetic disc, wherein said predetermined distance by which said inner and outer opto-magnetic heads are separated from each other is equal to said width of the outer and inner record regions.

3. An apparatus according to claim 2, wherein said outer and inner opto-magnetic heads are movable over a distance equal to a fourth of a radius of the opto-magnetic disc.

4. An apparatus according to claim 1, wherein said means for moving the erasing and reproducing opto-magnetic head unit comprises a slider on which said outer and inner opto-magnetic heads are placed, a pair of slide rails, bearings for supporting the slider between the slide rails, and electromagnetic driving means for moving the slider in the radial direction of the opto-magnetic disc.

5. An apparatus according to claim 1, wherein a ratio of a record density in the outer record region relative to the inner record region is set to 3/2, and upon recording, a signal to be recorded is divided into groups each including five bytes whose three bytes and two bytes are alternately distributed to the outer and inner opto-magnetic heads, respectively, and upon reproducing, three bytes reproduced by said outer opto-magnetic heads and two bytes reproduced by said inner otpo-magnetic heads are alternately combined to derive a reproduced signal.

6. An apparatus according to claim 5, wherein said signal to be recorded includes a synchronizing code of ten bytes, an information length of an integer multiple of five bytes, and the number of interleaves for parity of an integer multiple of five.

7. An apparatus according to claim 1, wherein one revolution of an information track on the opto-magnetic disc is divided into eight sectors and one field of a television signal is formed by five sectors.

8. An apparatus according to claim 5, further comprising a signal processing circuit which includes a dividing circuit for dividing the information signal to be recorded into a number of groups each containing five bytes, a memory circuit for storing said five bytes, a first read out circuit for reading out three bytes among said five bytes stored in the memory circuit and supplying serially the read out three bytes to the outer opto-magnetic head of the recording and reproducing opto-magnetic head unit, and a second read out circuit for reading out the remaining two bytes and supplying serially the read out two bytes to the inner opto-magnetic head of the recording and reproducing opto-magnetic head unit.

9. An apparatus according to claim 8, wherein said signal processing circuit further comprises a first switch for selecting one of reproduced television signals from the erasing and reproducing opto-magnetic head unit and the recording and reproducing opto-magnetic head unit, first and second field memories for storing the reproduced television signal, a second switch for selectively supplying the reproduced television signal selected by the first switch to the first and second field memories and a third switch for selecting television signals read out of the first and second field memories to derive a reproduced television signal in a slow motion mode.

* * * * *

UNITED STATES PATENT OFFICE
CERTIFICATE OF CORRECTION

PATENT NO. : 4,802,021
DATED : January 31, 1989
INVENTOR(S) : NAKAGAWA ET AL.

It is certified that error appears in the above-identified patent and that said Letters Patent is hereby corrected as shown below:

On the title page, under item [19] "Makagawa" should read --Nakagawa--

On the title page of the patent, the spelling of the names of the inventors should be --Shozo Nakagawa and Syunichi Onishi--.

Column 1, line 13, "be" should be --by--.

Column 2, line 1, "head" should be --heads--.

Column 2, line 40, after "la" delete "l".

Column 3, line 17, "1/3" should be --2/3--.

Column 4, line 1, "husing" should be --using--.

Column 4, line 3, after "recorded" insert --, a signal representing sector numbers is recorded--.

UNITED STATES PATENT AND TRADEMARK OFFICE
CERTIFICATE OF CORRECTION

PATENT NO. : 4,802,021

DATED : January 31, 1989

INVENTOR(S) : Nakagawa, et al

It is certified that error appears in the above-identified patent and that said Letters Patent is hereby corrected as shown below:

Column 5, claim 1, line 44, "having" should be -- moving --.

Signed and Sealed this

Thirty-first Day of July, 1990

Attest:

Attesting Officer

HARRY F. MANBECK, JR.

Commissioner of Patents and Trademarks